US009635193B2

(12) United States Patent
Kato

(10) Patent No.: US 9,635,193 B2
(45) Date of Patent: Apr. 25, 2017

(54) DOCUMENT READING DEVICE

(71) Applicant: KYOCERA Document Solutions Inc., Osaka (JP)

(72) Inventor: Ryosuke Kato, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/055,586

(22) Filed: Feb. 27, 2016

(65) Prior Publication Data

US 2016/0255212 A1    Sep. 1, 2016

(30) Foreign Application Priority Data

Feb. 27, 2015  (JP) .................................. 2015-037781

(51) Int. Cl.
H04N 1/04     (2006.01)
H04N 1/00     (2006.01)
H04N 1/10     (2006.01)

(52) U.S. Cl.
CPC ..... *H04N 1/00082* (2013.01); *H04N 1/00352* (2013.01); *H04N 1/00702* (2013.01); *H04N 1/00795* (2013.01); *H04N 1/1061* (2013.01); *H04N 2201/0081* (2013.01); *H04N 2201/0094* (2013.01)

(58) Field of Classification Search
CPC ........... H04N 1/00082; H04N 1/00352; H04N 1/00702; H04N 1/00795; H04N 1/1061; H04N 2201/0081; H04N 2201/0094
USPC ....... 358/488, 486, 474, 497, 400, 500, 505; 399/379, 380; 382/312
See application file for complete search history.

(56) References Cited

U.S. PATENT DOCUMENTS

| | | | | | |
|---|---|---|---|---|---|
| 5,974,284 | A | * | 10/1999 | Sato | ....... G03G 15/50 358/401 |
| 6,965,461 | B1 | * | 11/2005 | Chiang | ....... H04N 1/00352 358/474 |
| 8,379,276 | B2 | * | 2/2013 | Fujishita | ....... H04N 1/00002 358/444 |
| 8,587,843 | B2 | * | 11/2013 | Enami | ....... H04N 1/00681 358/474 |
| 9,317,148 | B2 | * | 4/2016 | Arakawa | ....... G06F 3/041 |
| 9,338,317 | B2 | * | 5/2016 | Choi | ....... H04N 1/00687 |

(Continued)

FOREIGN PATENT DOCUMENTS

JP     2011-151570 A     8/2011

*Primary Examiner* — Cheukfan Lee
(74) *Attorney, Agent, or Firm* — Hawaii Patent Services; Nathaniel K. Fedde; Kenton N. Fedde

(57) ABSTRACT

Provided is a document reading device that can cause an image processing part to execute automatically image processing operations corresponding to respective plural functions, depending on a document mounting condition on a platen without performing a setting operation on a panel part. A system control part causes a document detection sensor to detect a part (periphery) of the document. The image processing operations corresponding to respective plural functions are made on image data of the document read by a scanner part. Further, when the platen cover plate open-close detection sensor detects that the platen cover plate is closed, the image processing part is allowed to execute a function that is assigned to the document detection part that has read the document.

6 Claims, 11 Drawing Sheets

(56) References Cited

U.S. PATENT DOCUMENTS

| | | | | |
|---|---|---|---|---|
| 2005/0111894 A1* | 5/2005 | Hosoi | .................. | G03G 15/607 |
| | | | | 399/371 |
| 2006/0055968 A1* | 3/2006 | Sato | .................. | H04N 1/32358 |
| | | | | 358/1.15 |
| 2006/0235896 A1* | 10/2006 | Matoba | .............. | H04N 1/00474 |
| 2010/0315681 A1* | 12/2010 | Misawa | ............. | H04N 1/32144 |
| | | | | 358/1.15 |
| 2011/0299131 A1* | 12/2011 | Murata | ............. | H04N 1/00681 |
| | | | | 358/448 |
| 2013/0265251 A1* | 10/2013 | Arakawa | ............... | G06F 3/0488 |
| | | | | 345/173 |
| 2016/0205280 A1* | 7/2016 | Kato | ................. | H04N 1/00551 |
| | | | | 358/1.12 |

* cited by examiner

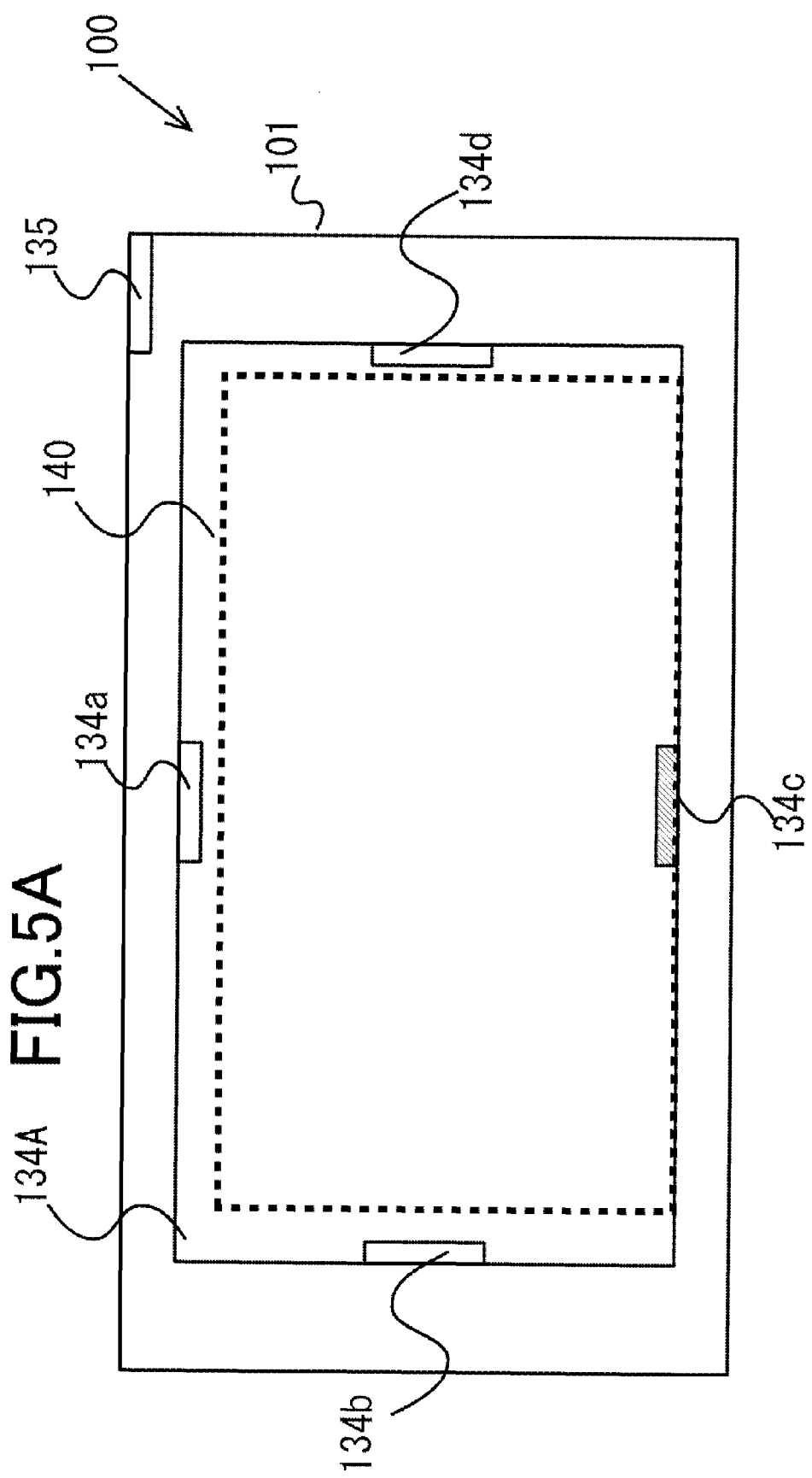

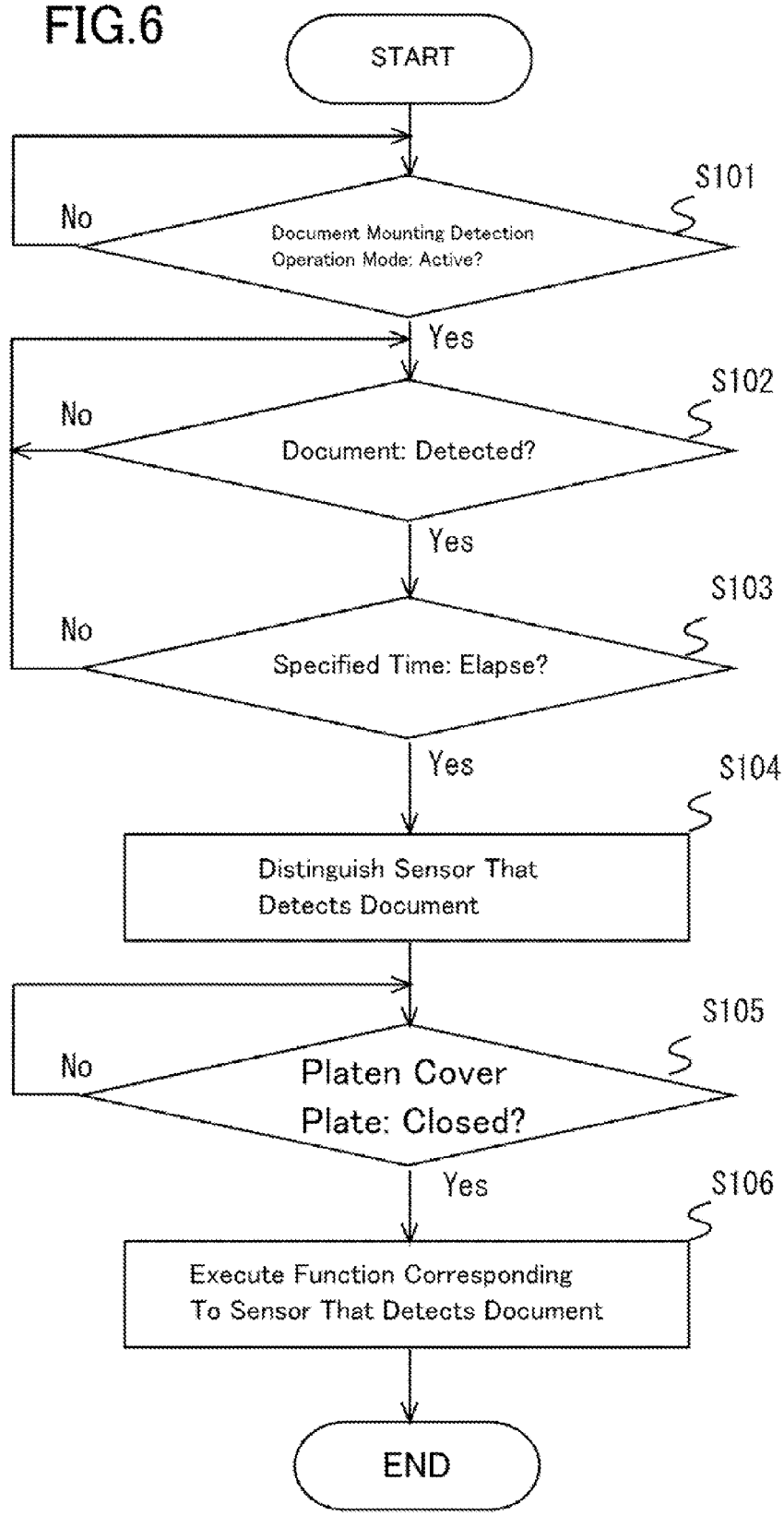

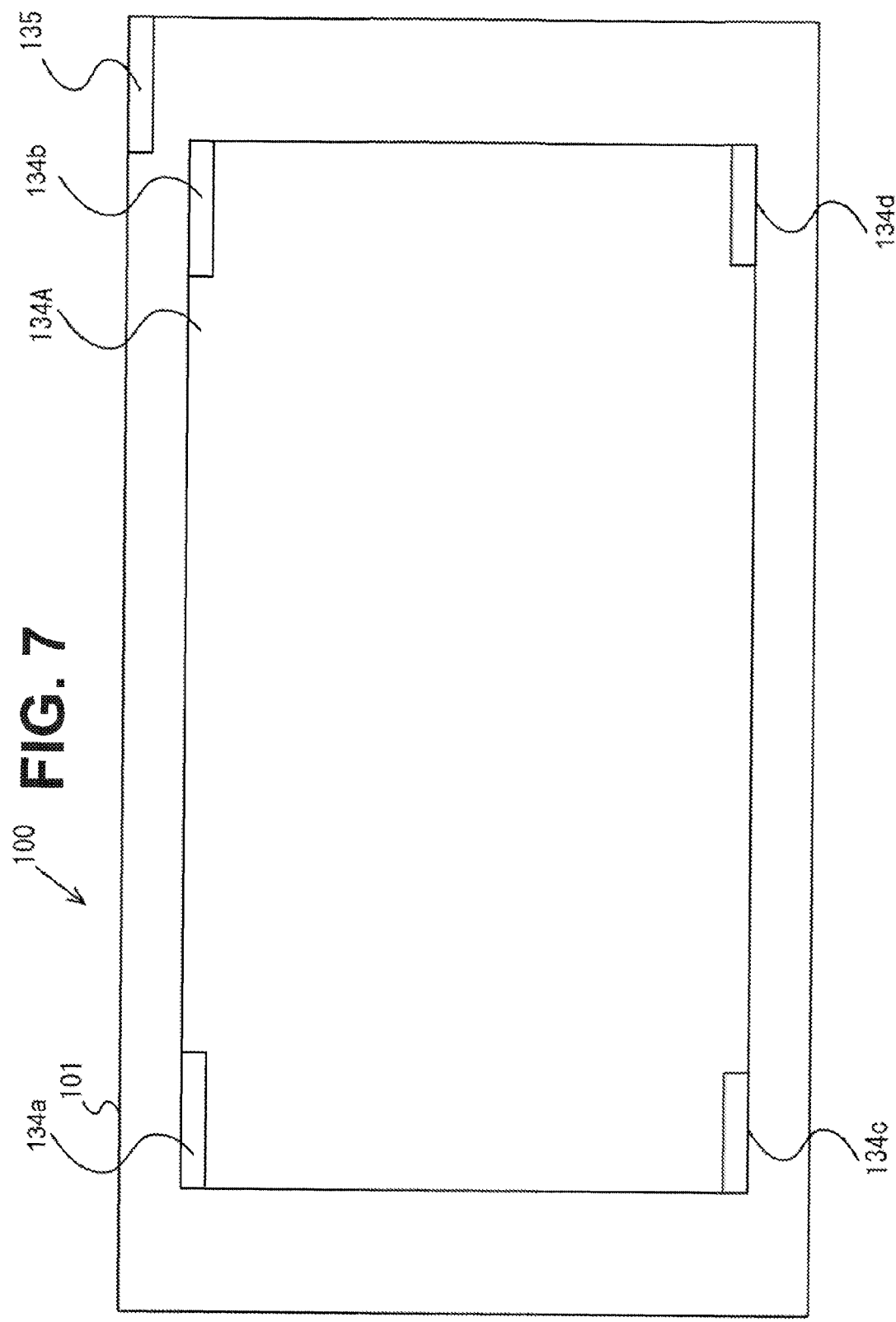

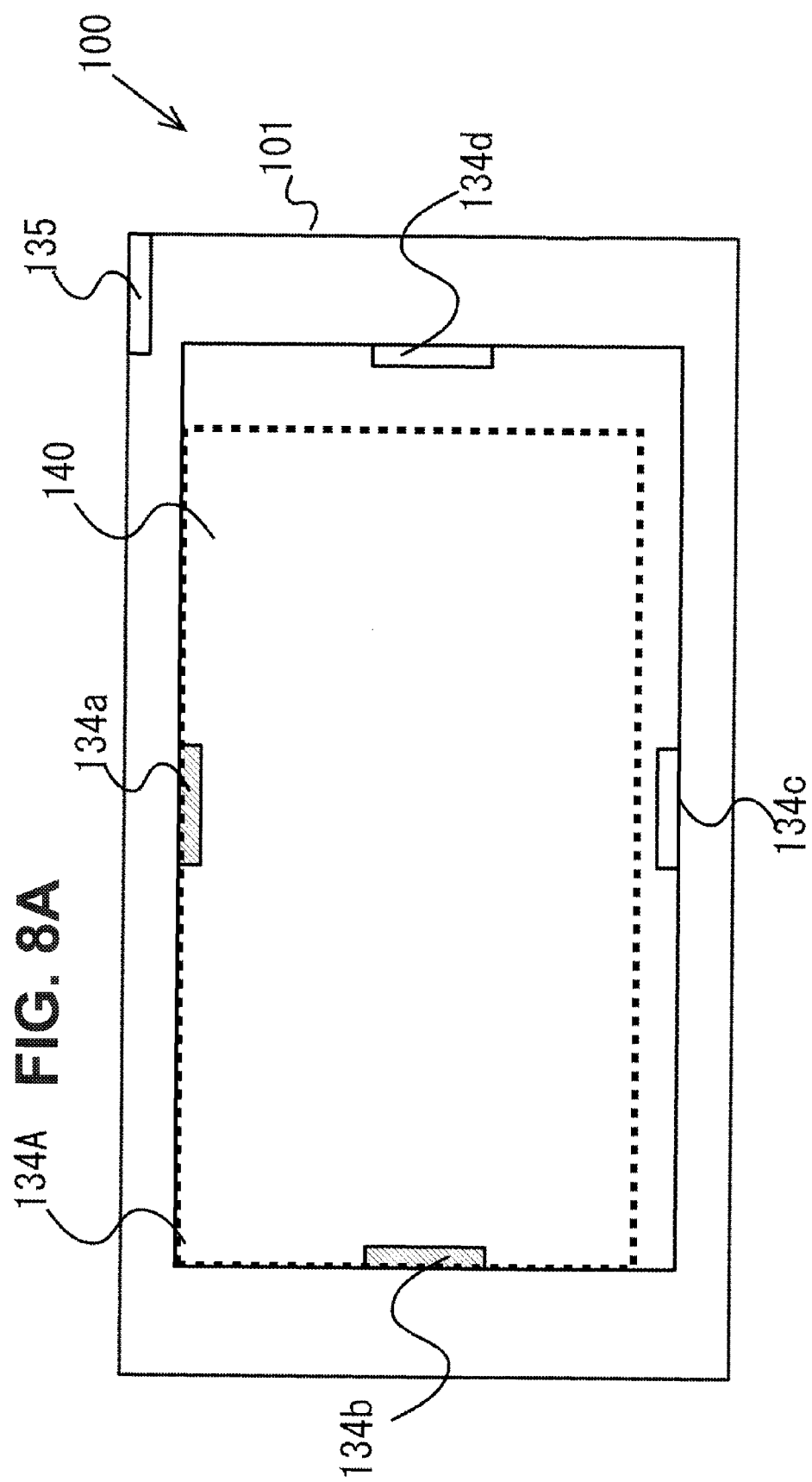

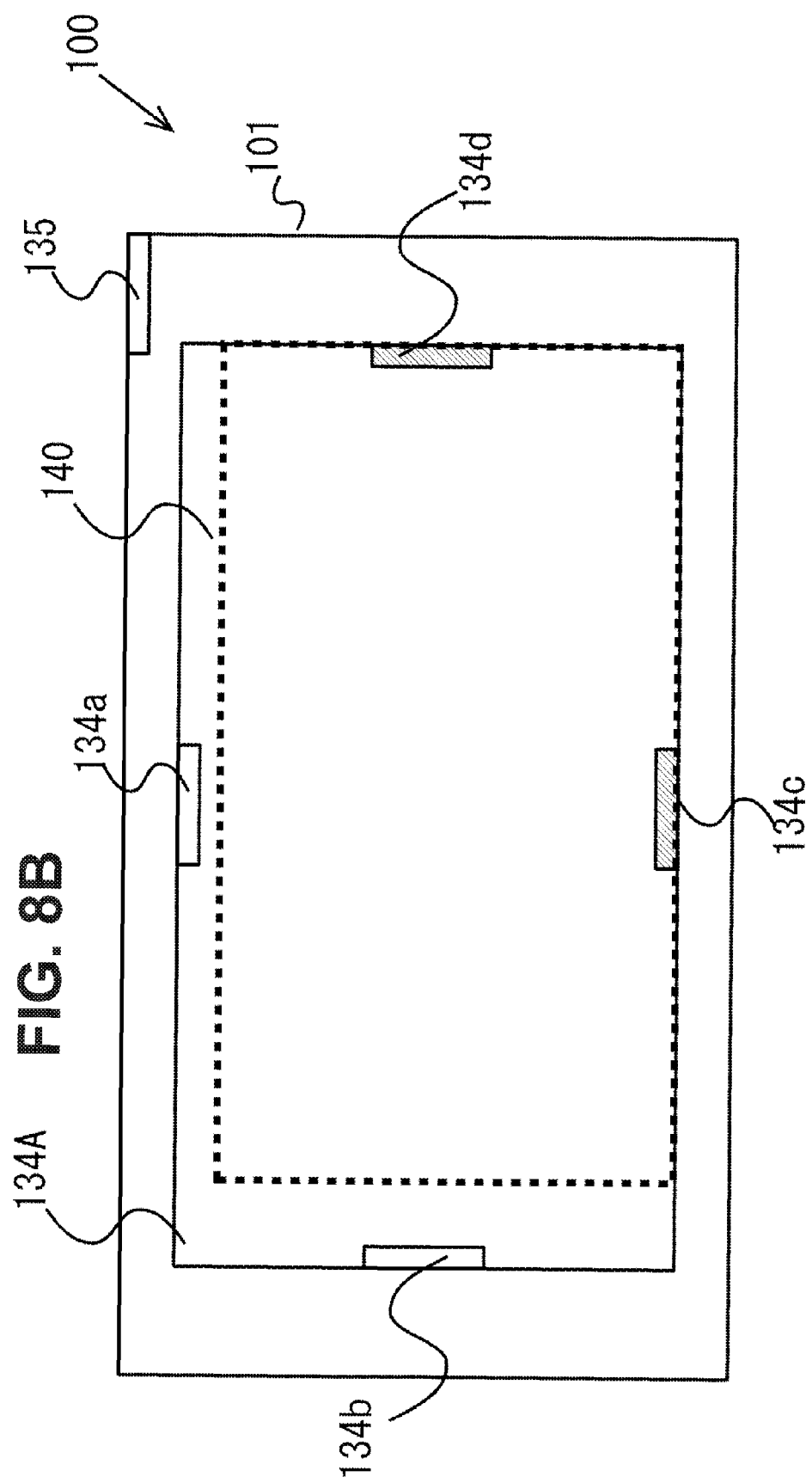

DOCUMENT READING DEVICE

INCORPORATION BY REFERENCE

This application is based on and claims the benefit of priority from Japanese Patent Application No. 2015-037781 filed on Feb. 27, 2015, the entire contents of which are hereby incorporated by reference.

BACKGROUND

The present disclosure relates to a document reading device that is configured to read an image of a document that is placed on a platen.

For example, an image forming device such as an MFP (Multifunction Peripheral) is a multi-functional peripheral equipment that mounts multi operation functions including, for example, copy, print, and FAX (Facsimile) functions as well as a user box function.

In order to use these functions, it is common that operations are conducted on the panel part for setting the functions to be used. In this case, conducting operations that include placing a document on a platen formed of glass, closing a platen cover plate, setting functions or the like on the setting screen of the panel part which are to be used, and manipulating a start button on the panel part will start executing a process pursuant to the function that is set through the setting screen of the panel part. It is to be noted that setting functions or the like on the setting screen of the panel part which are to be used may be conducted before placing the document on the platen formed of glass may be performed.

In this way, using any one of the functions of the MFP involves inevitably an intervening such as setting operations to be used that are conducted on the setting screen of the panel part, thereby impairing an improvement of operational efficiency.

In order to overcome such a drawback, it is possible to think that an idea of control method is applicable to an image reading device wherein when at least detection means detects a closed state of the platen cover plate, even without user's instruction to start reading, for example, a control means causes a reading means to read an image of the document mounted on the platen, thereby causing a display part to display the resulting image.

In the preceding control method of the image reading device, only mounting a document on the platen and subsequent closure of the platen cover plate will display image read from the document on the display part. Thereby, without having to receive the user's instruction to initiate the image reading, it is possible to achieve the automatic reading of the document mounted on the platen, thereby allowing for previewing the mounting state of the document on the platen.

SUMMARY

According to an aspect of the present disclosure, a document reading device of the present disclosure includes a scanner part, an image processing part, a plural document detection sensors, a platen cover plate open-close detection sensor and a system control part. The scanner part is configured to read a document mounted on a platen. The image processing part is configured to execute image processing operations, which depends on respective plural functions, on image data of the read document. The plural document detection sensors are arranged at a periphery of the platen, the plural document detection sensors being assigned respectively to the plural functions. The platen cover plate open-close detection sensor is configured to detect an open and close movement of the platen cover plate that is configured to cover the platen. The system control part is configured to cause the image processing part to execute, when any one of the plural document detection sensors detects a part of the document and the platen cover plate open-close detection sensor detects that the platen cover plate is closed, one of the plural functions which corresponds to the document detection sensor that detects the document.

BRIEF DESCRIPTION OF THE DRAWINGS

FIG. 5A is a view for explaining that one of the document detection sensors shown in FIG. 2 detects a part (a portion of periphery) of the document i.e. that for example the one of the document detection sensors to which a FAX function is assigned detects the part (the portion of periphery) of the document;

FIG. 6 is a flowchart illustrating an operation of the MFP shown in FIG. 1, the MFP being in a document mounting detection operation mode;

FIG. 7 is a view showing that document detection sensors are placed at four corners of a platen;

FIG. 8A is a view for explaining another example wherein one of the document detection sensors shown in FIG. 2 detects a part (a portion of periphery) of a document i.e. for example a part (a portion of periphery) of the document is to be detected by two of the document detection sensors to which a process is assigned that causes a scanner part to read the document and causes a USB memory to store the resulting image data; and FIG. 8B is a view for explaining another example wherein one of the document detection sensors shown in FIG. 2 detects a part (a portion of periphery) of a document i.e. for example a part (a portion of periphery) of the document is to be detected by two of the document detection sensors to which a process is assigned that causes a scanner part to read the document and enables a communication via an I/F.

DETAILED DESCRIPTION

Hereinbelow, with reference to FIGS. 1 to 4, a description is made as to a document reading device according to an exemplary embodiment of the present disclosure. It is to be noted that in the following description as an example of the document reading device an MFP (Multifunction Peripheral) is employed, the MFP, which is a multi-functional peripheral device, being provided with multi operation functions including, for example, copy, print, and FAX (Facsimile) functions as well as a user box function. The MFP is also, assumed to have a position correction function for correcting a positional displacement of a document 140 as will be described later.

Figure 1:
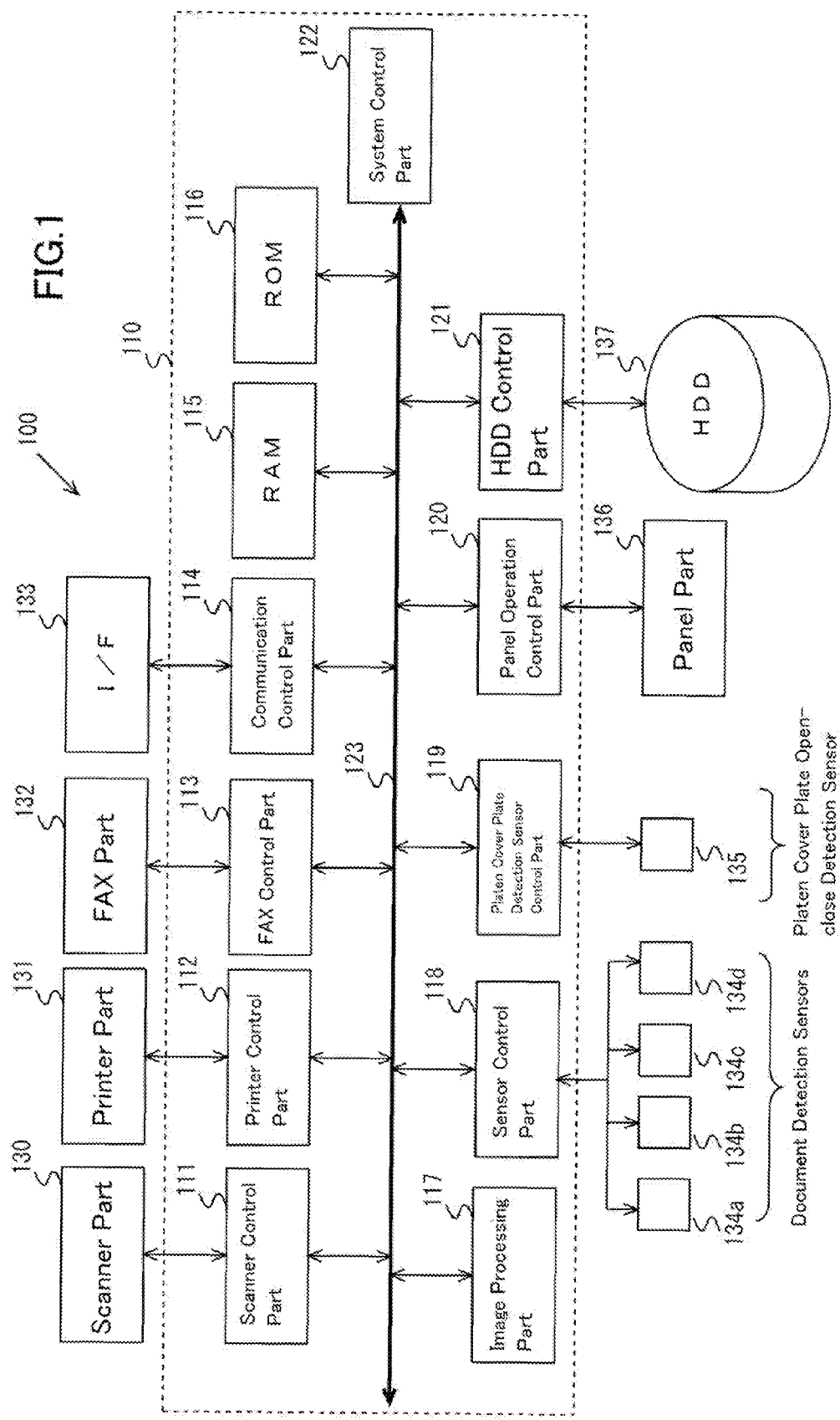
FIG. 1 is a view illustrating an exemplary embodiment of the present disclosure wherein a document reading device thereof is in the form of an MFP.

First of all, as shown in FIG. 1, an MFP 100 includes a control part 100, a scanner part 130, a printer part 131, a FAX part 132, and an I/F (Interface) 133, document detection censors 134a to 134d, a platen cover plate open-close detection sensor 135, a panel part 136, and a HDD (Hard Disk Drive).

The scanner part 130 is configured to input, to the control part 110, image data of the document 140 that is read by an image sensor (not shown). That is to say, the scanner part 130 is configured to convert image signals of the documents which are fed from the image sensor (not shown) into plural image data sets and input the resulting image data sets, one by one, to the control part 130.

The printer part 131 is configured to print an image on a sheet based on the image data set that is outputted from the control part 131. The FAX part 132 is configured to transmit, to its mating facsimile via a telephone line, the image data set(s) that is (are) outputted from the control part 110. The FAX part 132 is, also, configured to receive image data set(s) from the mating facsimile and inputs the resulting image data sets(s) to the control part 110. That is to say, the FAX part 132 is configured to control its connection to an NCU (Network Control Unit). Then, the FAX part 132 is configured to compress and modulates the image data set(s) output from the control part 110, and transmits, to the mating facsimile, the resulting image data set(s). The FAX part 132 is also configured to demodulate and expand the image data set(s) from the mating facsimile, and to input the resulting image data set(s) to the control part 110.

The I/F 133 is configured to communicate with, for example, a client terminal (not shown). At this time, the I/F 133 communicates therewith via a network such as an in-house LAN (Local Area Network).

Figure 2:
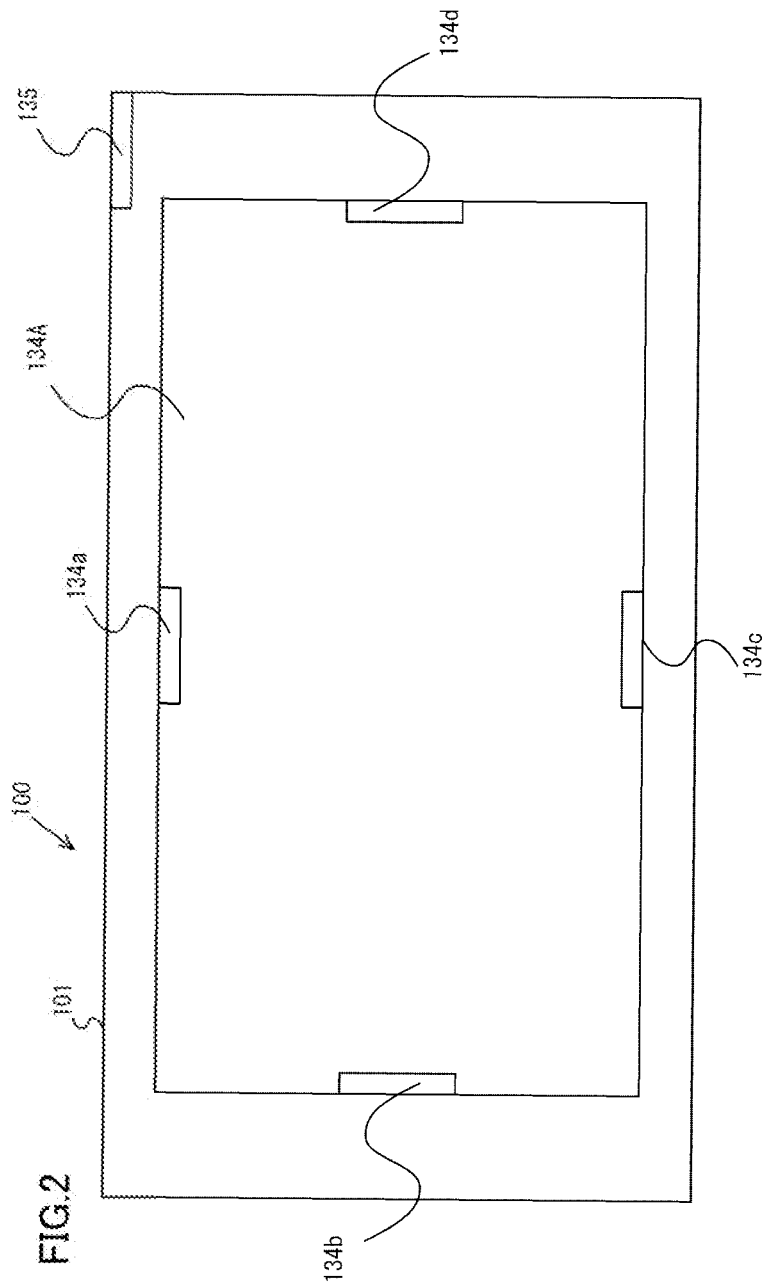
FIG. 2 is a view for explaining an arrangement of document detection sensors on a platen of the MFP shown in FIG. 1.

The document detection sensors 134a to 134d are configured to detect the document 140 as will be described later. That is to say, for example, as shown in FIG. 2, the document detection sensors 134a to 134d are arranged around (at a periphery of) a platen 134A formed of glass which is provided at an upper side portion of a housing body 101 of the MFP 100.

Here, the document detection sensors 134a to 134d are configured to be assigned for execution to their corresponding functions that the MFP 100 has. In other words, the document detection sensors 134a is assigned to execute, for example, a copy function. In addition, the document detection sensor 134b is assigned to execute a print function. Further, the document detection sensors 134c is assigned to execute a FAX function. Moreover, the document detection sensors 134d is assigned to execute a user box function.

It is to be noted that the assignments of the document detection sensors 134a to 134d may be set in arbitrary manner by operating a setting screen of the panel part 136.

Figure 3:
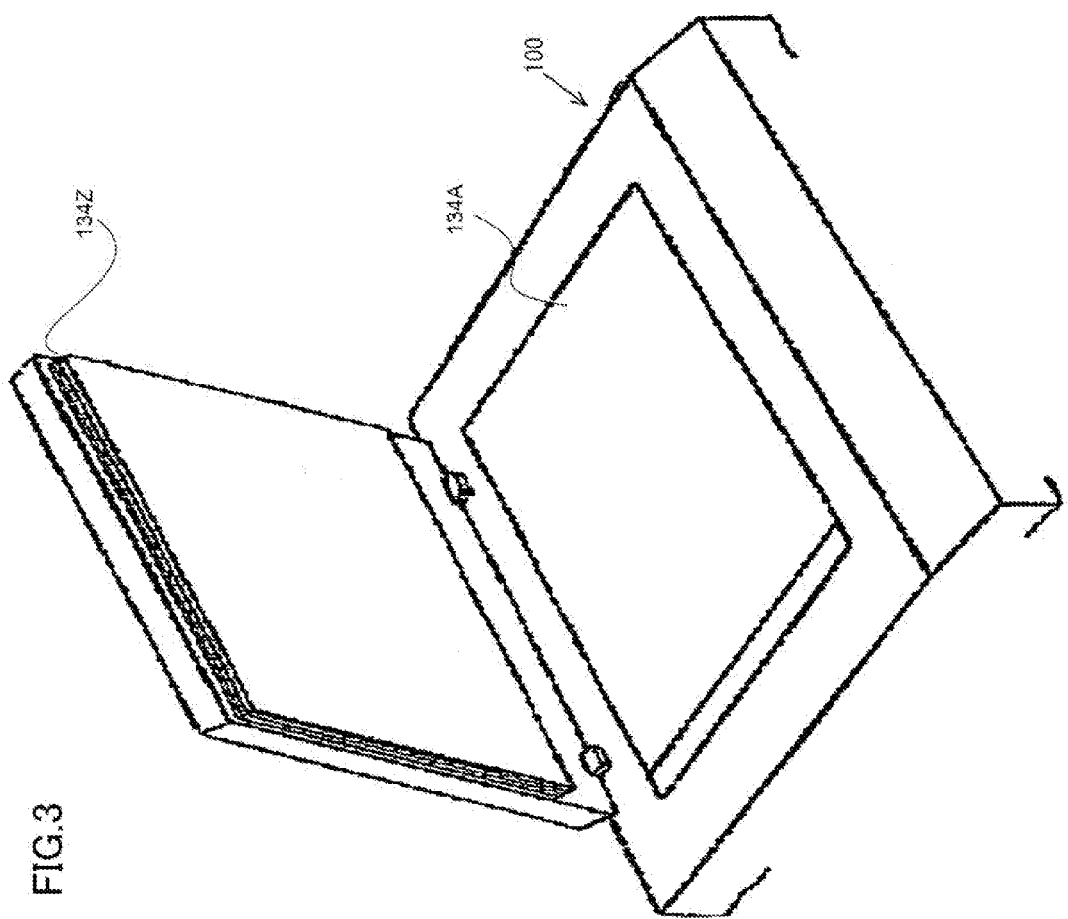
FIG. 3 is a view showing a platen cover plate pivotally mounted on the MFP.

As shown in FIG. 3, the platen cover plate open-close detection sensor 135 is configured to detect an open and close movement of a platen cover plate 134Z that is configured to cover the platen 134A. The platen cover plate open-close detection sensor 135 is positioned, for example, in the vicinity of the platen 134A of the housing body 101 of the MFP 100.

The panel part 136 is configured to display operation buttons for selecting any one of the printing, FAX, and scan functions of the MFP 100, and for performing various settings. The panel pert 136 is also configured to display a setting screen for setting the aforementioned assignments to the document detection sensors 134a to 134d. The panel part 136 is also configured to display, for example, a setting screen for determining whether a platen detection operation mode is to be made effective or not.

In the HDD 137, there are stored, for example, application programs from which the various functions of the MFP 100 are provided. In the HDD 137, there are also provided a user box and so on.

The control part 110, which serves for controls entirely the operations of the MFP 100, includes a scanner control part 111, a printer control part 112, a FAX (Facsimile) control part 113, a communication control part 114, a RAM (Random Access Memory) 115, a ROM (Read Only Memory) 116, an image processing part 117, a sensor control part 118, a platen cover plate sensor control part 119, a panel operation control part 120, a HDD control part 121, and a system control part 122. These are also connected to a data bus 123.

The scanner control part 111 is configured to control a reading operation of the scanner part 130. The printer control part 112 is configured to control a printing operation of the printer part 131. The Fax control part 113 is configured to control a transmission and reception operation of image data which is performed by the FAX part 132. The communication control part 114 is configured to control the communication via the I/F 133.

The RAM 115 is a work memory in which a program is executed. In the ROM 116, there are stored control programs or the like which are to check an operation of each of elements. The image processing part 117 is configured to perform an image processing to, for example, the image data of the document that is read by scanner part 130. That is to say, while the platen detection operation mode has been set to be effective by the panel part 136, either one of the document detection sensors 134a to 134d detects the document 140 as will be described later. At this stage, a process is executed corresponding to a function to which the any one of the document detection sensors 134a to 134d is assigned. This function is any one of the copy, print, FAX, and user box functions.

Figure 4A:
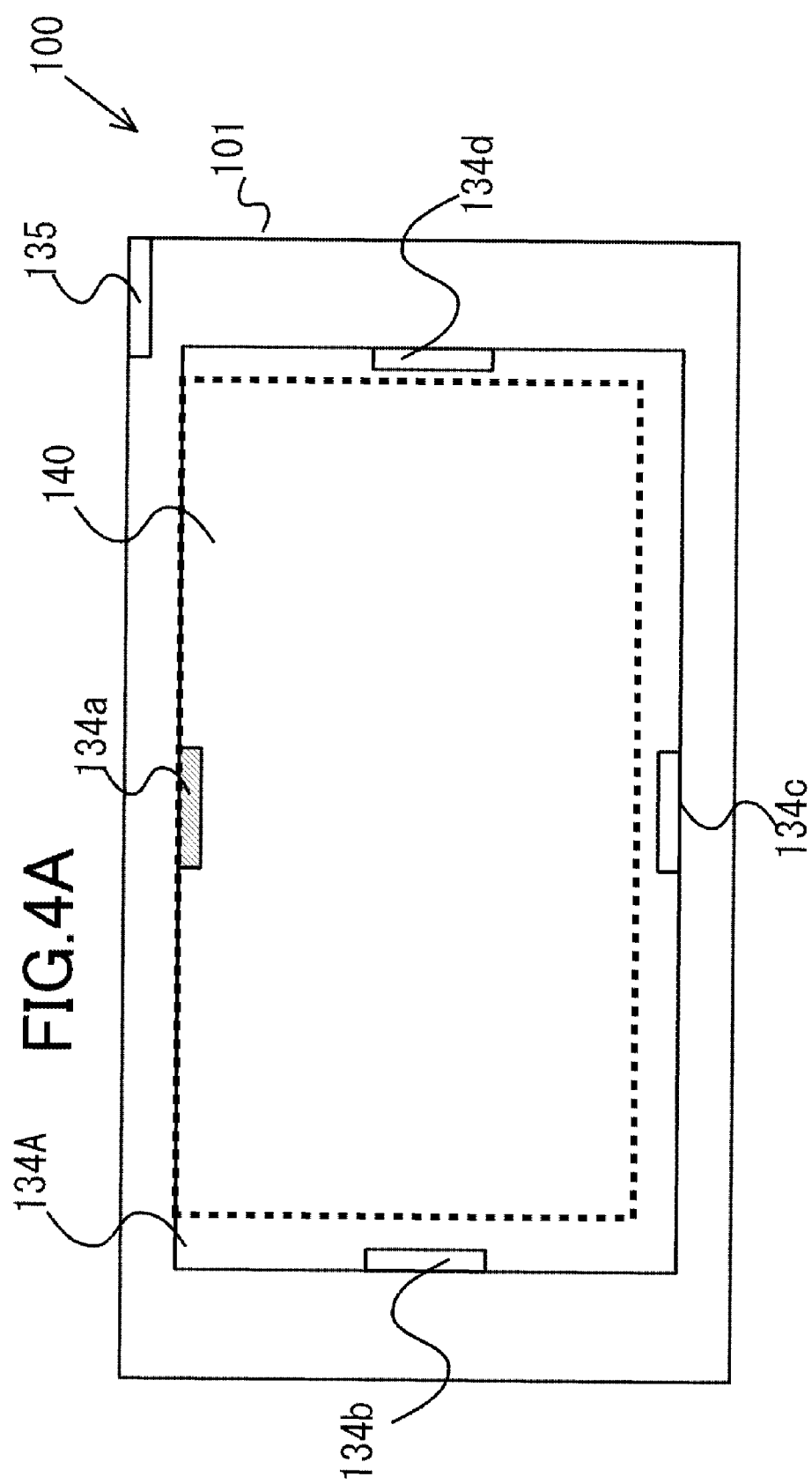
FIG. 4A is a view for explaining that one of the document detection sensors shown in FIG. 2 detects a part (a portion of periphery) of a document i.e. that for example the one of the document detection sensors to which a copy function is assigned detects apart (a portion of periphery) of the document.
Figure 4B:
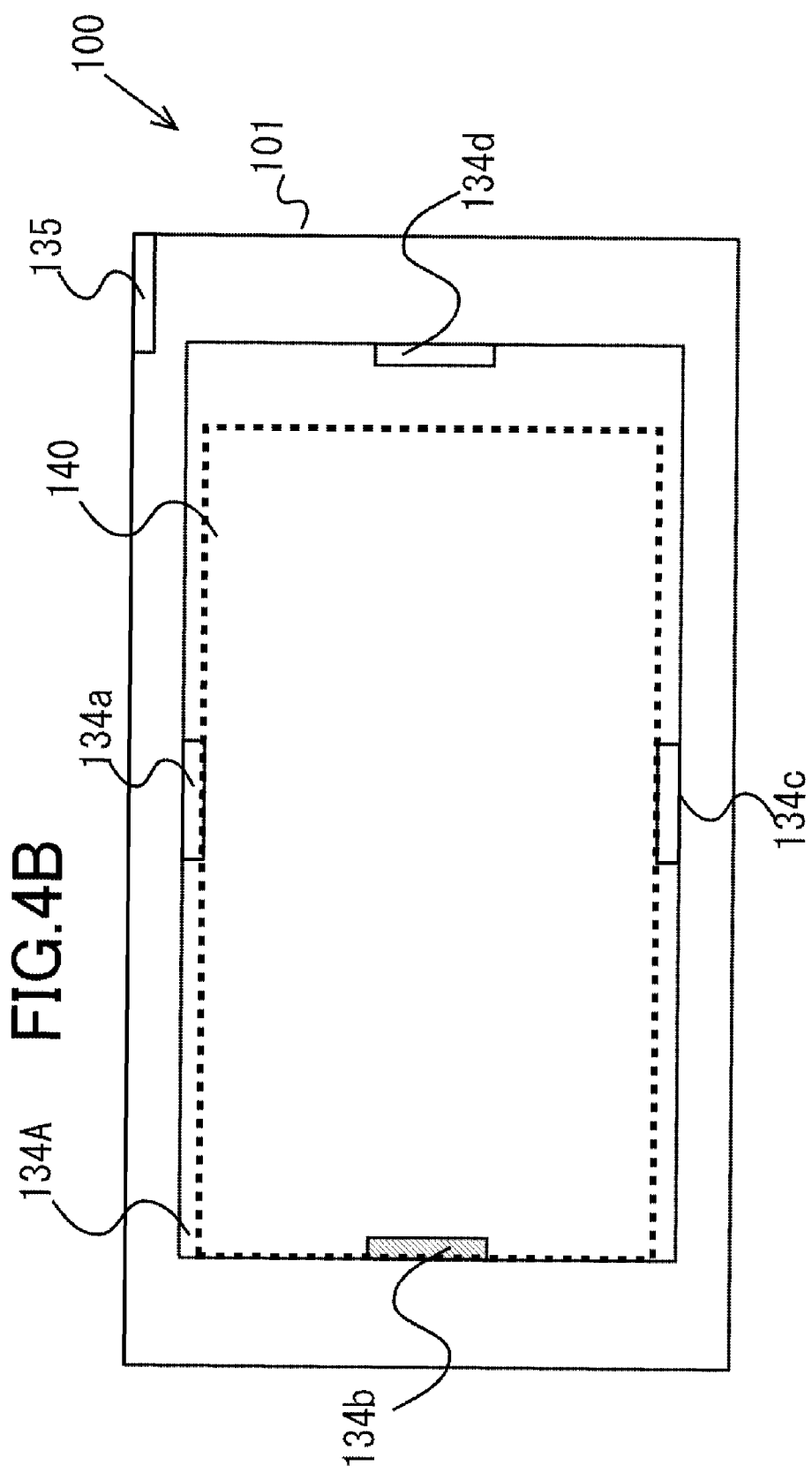
FIG. 4B is a view for explaining that one of the document detection sensors shown in FIG. 2 detects a part (a portion of periphery) of the document i.e. that for example the one of the document detection sensors to which a print function is assigned detects the part (the portion of periphery) of the document.
Figure 5B:
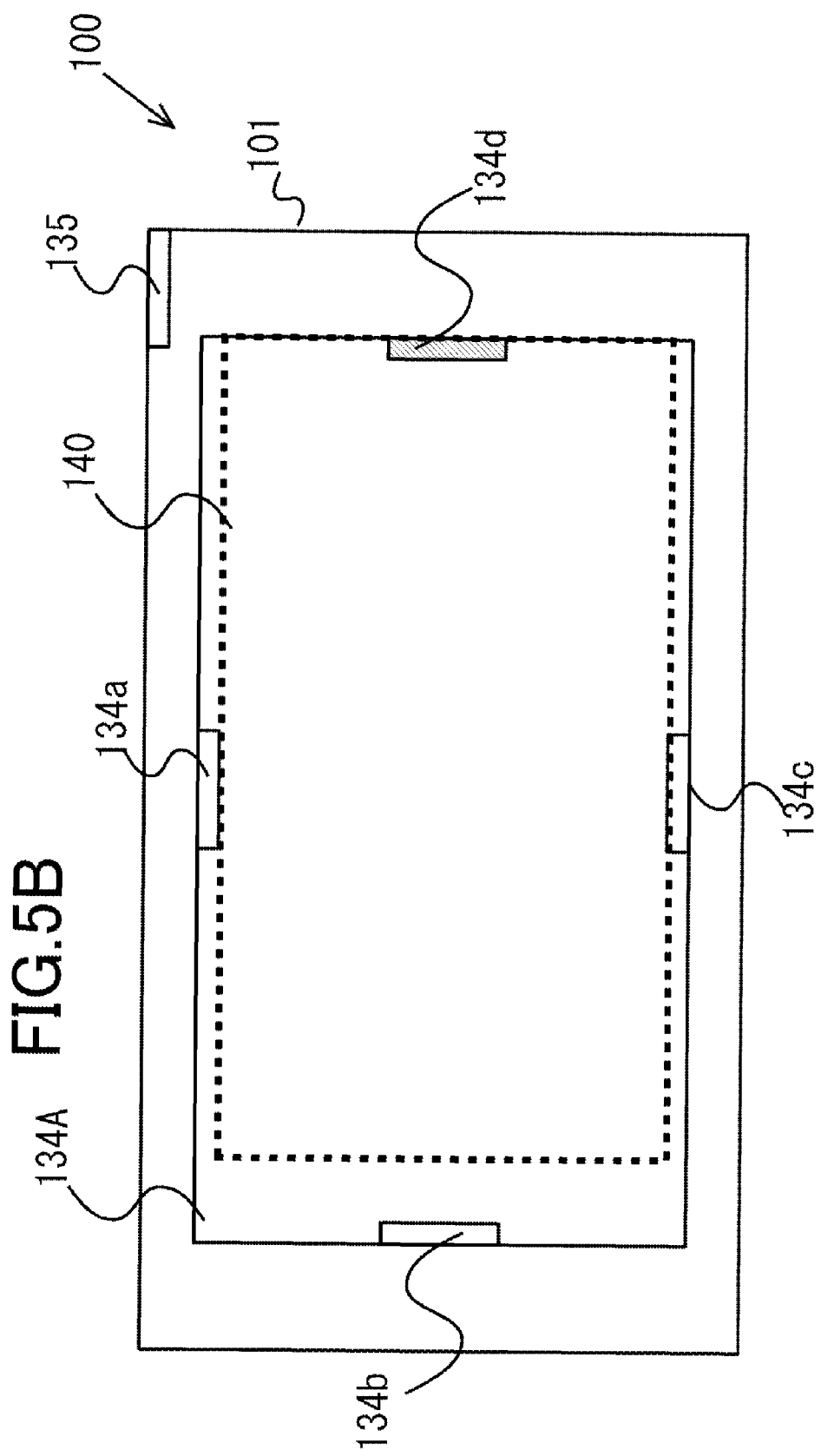
FIG. 5B is a view for explaining that one of the document detection sensors shown in FIG. 2 detects a part (a portion of periphery) of the document i.e. that for example the one of the document detection sensors to which a user box function is assigned detects the part (the portion of periphery) of the document.

In other words, for example, as shown in FIG. 4A, the document 140 is placed or mounted on the platen 134A such that a part (a portion of periphery) of the document 140 is superposed on the document detection sensor 134a. Then, the document detection sensor 134a detects the document 140. In addition, as shown in FIG. 4B, the document 140 is placed or mounted on the platen 134A such that a part (a portion of periphery) of the document 140 is superposed on the document detection sensor 134b. Then, the document detection sensor 134b detects the document 140. Further, as shown in FIG. 5A, the document 140 is placed or mounted on the platen 134A such that a part (a portion of periphery)

of the document 140 is superposed on the document detection sensor 134c. Then, the document detection sensor 134c detects the document 140. In addition, as shown in FIG. 5B, the document 140 is placed or mounted on the platen 134A such that a part (a portion of periphery) of the document 140 is superposed on the document detection sensor 134d. Then, the document detection sensor 134d detects the document 140.

Then, the image processing part 117, when the document 140 is detected by the document detection sensor 134a to which the copy function is assigned, performs an image processing (rasterization) to the document 140 that is read by the scanner part 130. The resulting image processing is a processing for converting the image data to data required for copying. The image processing part 117 also performs an image processing (rasterization) to the document 140 when the document 140 is detected by the document detection sensor 134b to which the print function is assigned. The resulting image processing is a processing for converting the image data of the document 140 read by the scanner part 130 to data required for printing. Further, the image processing part 117 performs, similar to the above, image processings (rasterizations) when the document 140 is detected by the document detection sensors 134c and 134d to which respectively the FAX function and the user box functions are assigned. It is to be noted that FIGS. 4A, 4B, 5A, and 5B show different mounting positions of the document 140 relative to the platen 134A. However, the aforementioned position correction function corrects displacements of the document that is in different mounting positions.

The sensor control part 118 is configured to control detection operations of the respective document detection sensors 134a to 134d. The platen cover plate sensor control part 119 is configured to control a detection operation of the platen cover plate open-close detection sensor 135.

The panel operation control part 120 is configured to control a display operation of the panel part 136. The HDD control part 121 is configured to control, for example, reading/writing operations of data from/to the HDD 137. The system control part 122 is configured mainly to distinguish which of the document detection sensors 134a to 134d, when the panel part 136 sets the platen detection operation mode effective, which will be detailed later. Then, the system control part 122 controls the image processing part 117 to execute any one of the aforementioned copy, print, FAX, and user box functions which are respectively assigned to the document detection sensors 134a to 134d.

Next, with reference to FIG. 6, a description will be made as to the platen detection operation mode of the MFP 100.

First of all, the system control part 122 determines whether or not the platen detection operation mode is set active (Step S101). At this stage, if the platen detection operation mode is not found active (Step S101: No), the platen detection operation mode is in condition for waiting a setting to be active. To the contrary, if the platen detection operation mode is found active (Step S101: Yes), the system control part 122 determines which of the document detection sensors 134a to 134d detects the document 140 (Step S102).

At this stage, if the system control part 122 determines that none of the document detection sensors 134a to 134d detects the document 140 (Step S102: No), each of the document detection sensors 134a to 134d is a condition for detecting the document 140. To the contrary, if the system control part 122 determines that either one of the document detection sensors 134a to 134d detects the document 140 (Step S102: Yes), the system control part 122 determines an elapse of time (Step S103). The reason why such a determination process is executed is that a movement of the document 140 on the platen 134A results in that fixing the position of the document 140 on the platen 134A and when the document 140 under the resulting condition is detected, in a short time period, by any one of the document detection sensors 134a to 134d, there is a fear of an execution of a process contrary to the user's intention.

For this reason, the system control part 122 waits until a set time period elapses (Step S103: No). If the system control part 122 determines the elapse of the set time period (Step S103: Yes), the system control part 122 distinguishes which of the document detection sensor 134a to 134d detects the document 140 (Step S104).

Next, the system control part 122 determines whether or not the platen cover plate 134Z for covering the platen 134A (Step: S105). That is to say, if the platen cover plate open-close detection sensor 135 founds that the platen cover plate 134Z is not closed, the system control part 122 determines that the platen cover plate 134Z is not closed (Step S105: No). To the contrary, if the platen cover plate open-close detection sensor 135 founds that the platen cover plate 134Z is closed, the system control part 122 determines that the platen cover plate 134Z is closed (Step S105: Yes).

Then, after the system control part 122 determines that the platen cover plate 134Z is closed, the system control part 122 causes the image processing part 117 to execute the processing corresponding to the any one of the document detection sensors 134a to 134d which detects the document 140 (Step S106).

That is to say, as described above, the system control part 122, when determines the document detection sensor 134a detects the document 140, causes the image processing part 117 to execute the copy function. In addition, the system control part 122, when determines the document detection sensor 134b detects the document 140, causes the image processing part 117 to execute the print function. Further, the system control part 122, when determines the document detection sensor 134c detects the document 140, causes the image processing part 117 to execute the FAX function. Moreover, the system control part 122, when determines the document detection sensor 134d detects the document 140, causes the image processing part 117 to execute the user box function.

In such a way, in the present exemplary embodiment, the system control part 122 causes a part (a portion of the periphery) of the document 140 to perform detection with any one of the document detection sensors 134a to 134d. Further, the platen cover plate open-close detection sensor 135 detects that the platen cover plate 134Z is closed. Then, the system control part 122 causes the image processing part 117 to execute the function corresponding to any one of the document detection sensors 134a to 134d which detects the document 140. The image processing part 117 executes plural image processing operations on the image data of the document that is read by the scanner part 130 by corresponding to the selected one of the plural functions.

Thereby, the detection of the part of the document by any of the document detection sensors will causes the image processing part to execute the function that is assigned to the document detection sensor that detects the document. Thus, it is possible for the image processing part 117, depending on the mounting condition of the document 140 on the platen 134A, to execute automatically the image processing operations corresponding to the respective plural functions. No setting operations are required on the panel part 136.

In addition, in the present exemplary embodiment, the document detection sensors 134a to 134d are positioned at the outer periphery of the platen 134A. Thus, the mounting of the document 140 on the platen 134A can be established by shifting the document 140 toward any one of the document detection sensors 134a to 134d. Even in such a case, regardless of the size of the document 140, one of the document detection sensors 134a to 134d is capable of infallibly detecting the part (periphery) of the document 140.

In summary, in a typical control method of an image reading device, though it is possible to eliminate the setting operations on a panel part, there is a problem that involves a disablement of automatic executions of the multi operation functions including the copy, print and FAX (Facsimile) functions, and the user box function.

To the contrary, according to the document reading device of the present disclosure, the detection of the part of the document by any of the document detection sensors will causes the image processing part to execute the function that is assigned to the document detection sensor that the document detects. Thus, it is possible for the image processing part, depending on the mounting condition of the document on the platen, to execute automatically the image processing operations without having to perform the setting operation on the panel part. The image processing operations correspond to the respective plural functions depending on the mounting condition of the document on the platen.

It is to be noted that the description of the present exemplary is made wherein the document detection sensors 134a to 134d are positioned at the periphery of the platen 134A. However, instead of this example, as shown in FIG. 7, the document detection sensors 134a to 134d may be positioned at four corners of the platen 134A.

In addition, in description of the present exemplary embodiment, the system control part 122 causes, in response to the detection of the part (periphery) of the document 140 by any one of the document detection sensors 134a to 134d, the image processing part 117 to execute the functions selectively that are assigned to the respective document detection sensors 134a to 134d. However, the concept of the present disclosure is not limited to this example.

That is to say, for example, as shown in FIG. 8A, in a case where the document detection sensors 134a and 134b detect, respectively, parts of sides of the document 140, for example, the scanner part 130 is available for reading the document 140. Then, it may be possible to employ a processing that causes a USB memory to store the resulting image data.

In addition, as shown in FIG. 8B, in a case where the document detection sensors 134c and 134d detect, respectively, parts of sides of the document 140, for example, the scanner part 130 is available for reading the document 140. Then, it may possible to employ a processing that transmits the resulting image data via the I/F 133.

It is to be not that changing the functions in an arbitrary manner which are to be assigned to the document detection sensors 134a to 134d may be allowable by a setting operation from the panel part 136. Not limited one function, each of the document detection sensors 134a to 134d may be assigned with plural functions, other than one function. In such a case, it may be possible to change, in an arbitrary manner, the number of functions by a setting operation from the panel part 136.

Further, it may be possible to change the functions to be assigned to the document detection sensors 134a to 134d on a user-by-user basis. In this case, for example, as the user identification, a log-in ID for accessing the MFP 100 is available. In this case, the functions to be assigned to the document detection sensors 134a to 134d may be changed depending on a user.

As described above, combining the document detection sensors 134a to 134d makes it possible to increase variations of automatic processing which is free from setting on the panel part 136.

In addition, it may be possible to display the functions on, for example, the panel part 136 which are assigned to the assigned to the document detection sensors 134a to 134d. In such a case, confirming the displayed content will bring an easy confirmation whether the mounting position of the document 140 on the platen 134A is correct in view of the required function.

What is claimed is:

1. A document reading device comprising:
a scanner part that is configured to read a document mounted on a platen;
an image processing part that is configured to execute image processing operations, which depends on respective plural functions, on image data of the read document;
plural document detection sensors which are arranged at a periphery of the platen, the plural document detection sensors being assigned respectively to one or more of the plural functions;
a platen cover plate open-close detection sensor that is configured to detect an open and close movement of the a platen cover plate that is configured to cover the platen;
a system control part that is configured to:
when any one of the plural document detection sensors detects the document, distinguish which of the plural document detection sensors detects the document; and
cause the image processing part to execute, when the platen cover plate open-close detection sensor detects that the platen cover plate is closed, the one or more of the plural functions which corresponds to the document detection sensor that detects the document; and
a panel part displaying the functions to which the plural document detection sensors are respectively assigned;
wherein
a plurality of the plural functions can be assigned to each of the document detection sensors;
the document reading device can be logged into by a plurality of users based on respective log-in identifications ('IDs'); and
the functions to which the plural document detection sensors are respectively assigned are changed based on the log-in ID of a logged in user.

2. The document reading device according to claim 1, wherein the system control part, when any one of the plural document detection sensors detects the part of the document, determines whether or not a specified time elapses and after the specified time elapses determines whether or not the platen cover plate open-close detection sensor detects that the platen cover plate is closed.

3. The document reading device according to claim 1, wherein the plural document detection sensors are arranged at four corners of the platen.

4. The document reading device according to claim 1, wherein the panel part comprises a setting screen which is provided for various settings and displays an operation button, wherein the operation button of the setting screen assigns either one of the functions to either one of the document detection sensors.

5. The document reading device according to claim 1, wherein the platen cover plate open-close detection sensor is positioned in the vicinity of the platen.

6. The document reading device according to claim 1, wherein the plural functions include a copy function, a printer function, a FAX function, and a user box function.

* * * * *